Sept. 7, 1948.　　　R. J. S. PIGOTT ET AL　　　2,448,735
APPARATUS FOR MEASURING FORCE EXERTED
BY A RESILIENT ANNULUS
Filed May 28, 1945　　　　　　　　　　　　3 Sheets-Sheet 1

Inventors
R. J. S. PIGOTT
PAUL G. EXLINE

By G. M. Houghton
Attorney

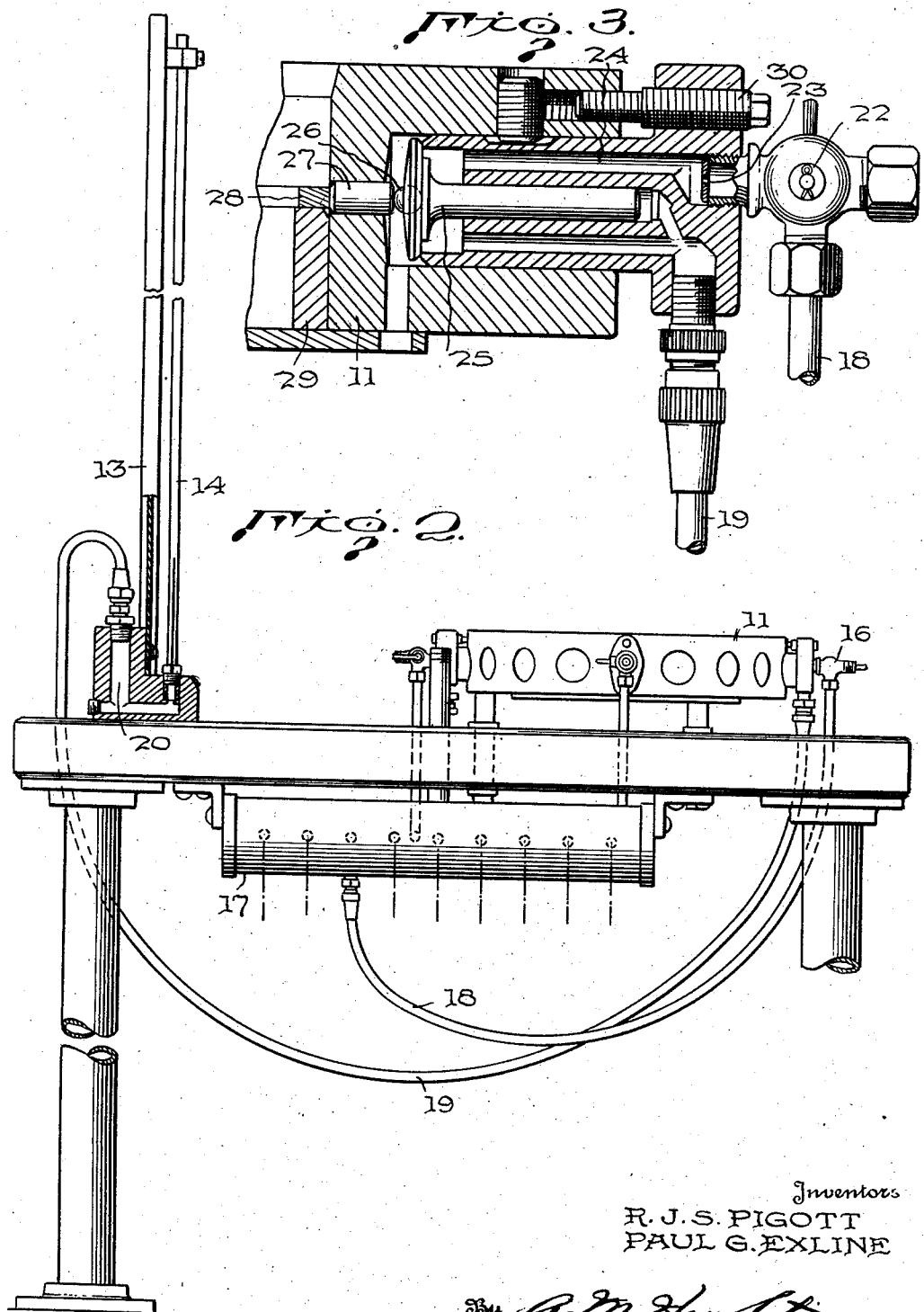

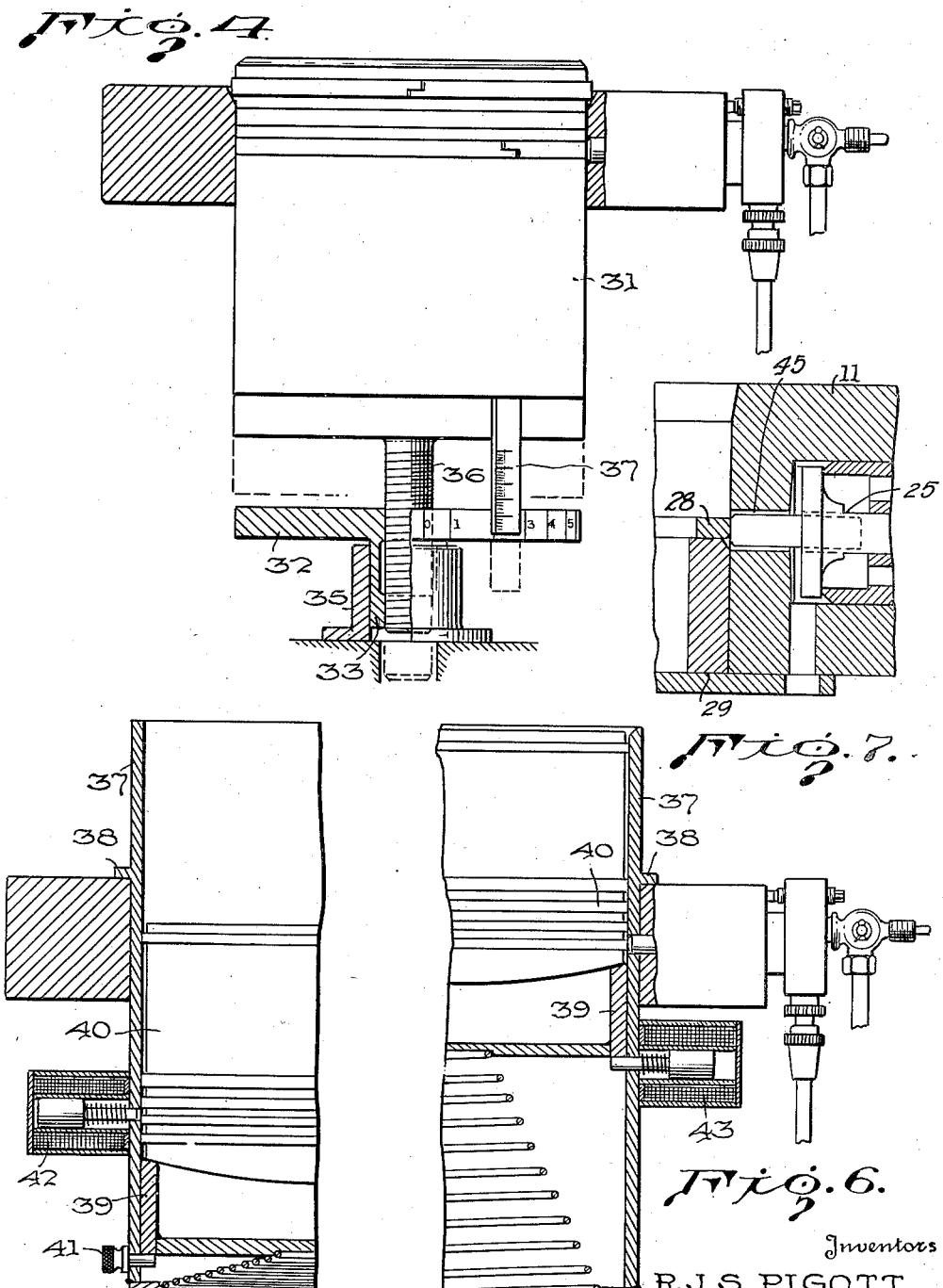

Patented Sept. 7, 1948

2,448,735

UNITED STATES PATENT OFFICE 2,448,735

APPARATUS FOR MEASURING FORCE EXERTED BY A RESILIENT ANNULUS

Reginald J. S. Pigott, Pittsburgh, and Paul G. Exline, Penn Township, Allegheny County, Pa., assignors to Gulf Research & Development Company, Pittsburgh, Pa., a corporation of Delaware Application May 28, 1945, Serial No. 596,260

12 Claims. (Cl. 73—120)

This invention relates to an apparatus for measuring force and more particularly to an apparatus for measuring the force exerted by a resilient annulus upon the walls of a conforming cylinder as, for example, the force exerted by a piston ring on the cylinder wall.

In the manufacture of piston rings and the determination of proper lubricants therefor, it is desirable to know the force exerted by piston rings on the cylinder wall. The principal function of piston rings in internal combustion engines is to prevent passing of combustion gases past the piston and to control the flow of lubricating oil from the crank case to the combustion chamber. Much work is being done to improve the performance of piston rings and one of the fundamental research problems is that of determining the optimum radial pressure which should exist between the piston ring and the cylinder wall.

In the prior art several types of piston ring force measuring instruments have been described. In general, the ring is supported in a cylinder of the same bore as the engine cylinder and force is applied at a point on the ring just sufficient to lift it from the surface. The ring is then rotated several degrees and the measurement repeated. This device has several disadvantages, as for example, it is quite slow and it requires both force and displacement measurement.

It is therefore a primary object of this invention to provide an improved apparatus for determining the force exerted by a resilient annulus, such as a piston ring upon the walls of a conforming cylinder.

A further object of this invention is to provide an apparatus for the measurement, selectively, at any or all of a plurality of points of the force exerted on a cylinder wall by a piston ring disposed therein.

A further object of this invention is to provide an apparatus for the measurement of the force exerted on a cylinder wall by a piston ring at a plurality of points and for the determination, from the data obtained at the plurality of points, the average wall pressure as well as the variations in values of wall pressure around the circumference of the piston ring.

A further object of this invention is to provide an apparatus for the measurement of the force exerted on a cylinder wall by a piston ring combining force and displacement measurement into a single measurement of air pressure.

These objects are attained in accordance with the present invention in which there is provided an apparatus wherein the force exerted by a resilient annulus, such as a piston ring, on the walls of a conforming cylinder is measured at a plurality of points simultaneously and is graphically illustrated. In general, the apparatus comprises a test cylinder having a plurality of small holes arranged equidistant about the circumference thereof in the plane where the piston ring to be measured is placed. Through each of the holes a plunger protrudes to press against the piston ring and force it just clear of the cylinder wall. Each plunger is operated by a separate force measuring unit arranged on the outer circumference of the test cylinder.

Each force measuring unit comprises a cylindrical chamber having a fixed orifice at one end adapted to admit compressed air or other fluid from a constant pressure source. At the other end is a variable orifice comprising an aperture having a machined narrow edge adapted to be closed by a disk. The compressed air is adapted to open the variable orifice and cause the disk to operate the above-mentioned plunger against the piston ring. Equilibrium is established when the opening of the variable orifice is such that the air flowing through it is equal to that flowing through the fixed orifice. The amount of resistance offered by the disk to the compressed air is registered in a manometer tube arranged in a bank of manometer tubes connected to each of the other force measuring units and thus providing a graphical illustration of the force exerted on the piston ring at each of the plurality of points.

The operation of the plungers thus utilizes the principle of a large change in pressure between a small fixed orifice and a variable orifice, and the variable orifice is designed to give a large change in flow area with a small displacement of a movable member. In this manner a combination measurement of both the force required to displace the piston ring and the amount of displacement is obtained. In other words, since the pressure in the force measuring unit is a function of the distance between the plunger head and its seat, with a constant supply pressure, a particular pressure reading may be readily translated into terms of distance of the plunger head from its seat and consequently of displacement of the ring under test, by reference to suitable calibration curves.

Preferred embodiments of the invention are hereinafter described in detail with particular reference to the accompanying drawings, wherein Figure 1 is an elevational view of the apparatus for measuring piston ring wall pressure;

Figure 2 is a side plan view partly in section of the apparatus shown in Figure 1;

Figure 3 is a side plan view partly in section of the valve mechanism;

Figure 4 is a side plan view of a piston elevating device for use with the apparatus of Figure 1;

Figure 5 is a device alternative to Figure 4; and

Figure 6 is a side plan view of the device of Figure 5 shown in a different position.

Figure 7 is a view partly in section of a modification of the device of Figure 3.

Figure 1:
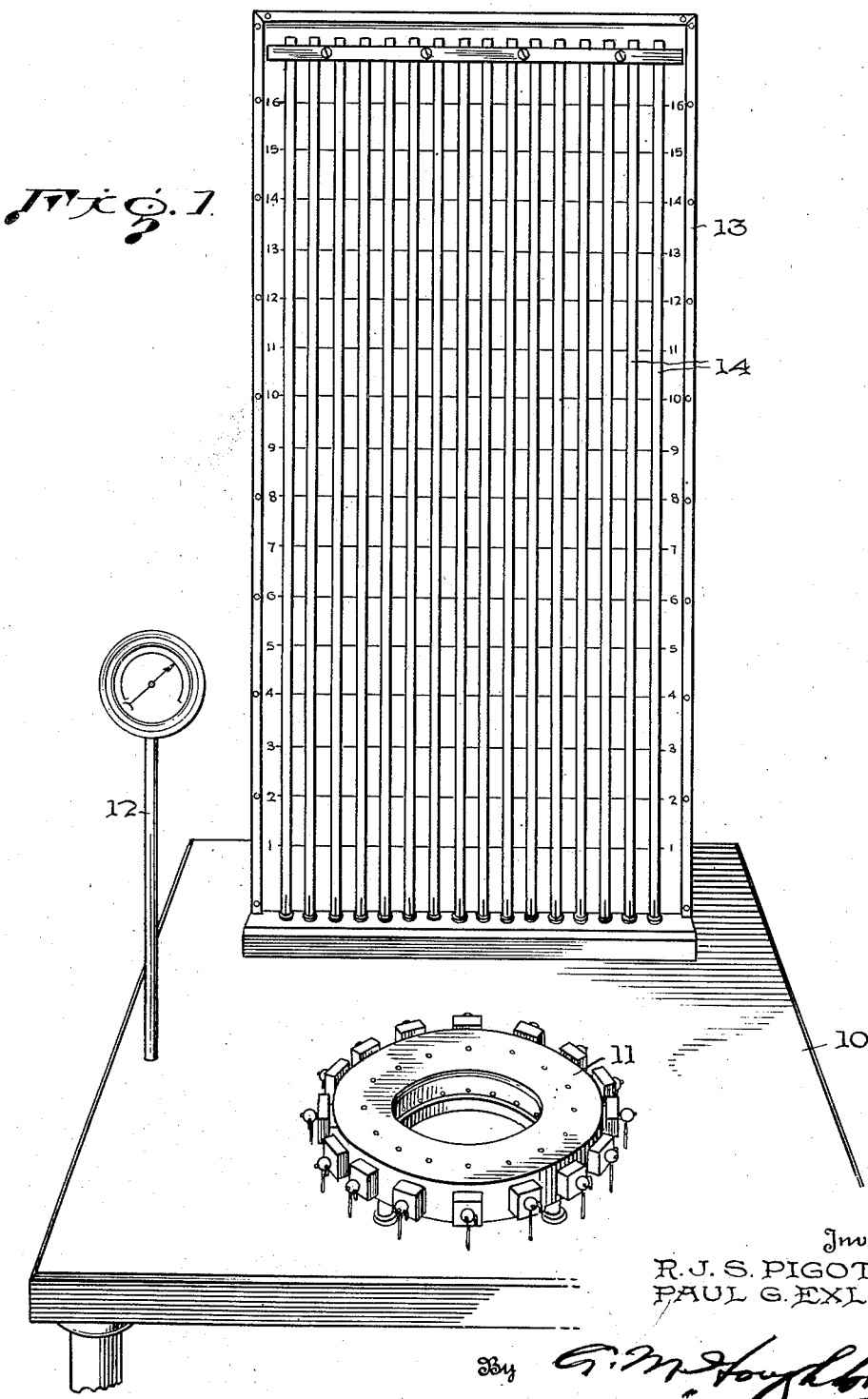

With reference to Figure 1, there is shown an elevational view of the entire apparatus. It comprises a base 10 upon which is mounted test cylinder 11, a manifold air pressure gauge 12 and a panel 13 of mercury containing manometer tubes 14.

The test cylinder 11 is shown in greater detail in Figure 2. It is provided with a plurality of force measuring units 16 of which in the device illustrated there are sixteen, but a greater or lesser number may be used. Each force measuring unit 16 receives fluid under pressure, preferably compressed air from a pressure manifold 17, preferably located under the base 10 and connected with the said force measuring unit by a plurality of tubes or conduits 18, only one of which is illustrated. Air pressure which is an indication of the force expended on a piston ring, as will hereinafter be more fully described, is transmitted from the force measuring unit 16 by conduits 19 to the panel 13, wherein there are a number of manometer tubes 14 equivalent to the number of force measuring units. A reservoir 20 at the base of each manometer tube provides the mercury to be used in each tube. It will be seen that the manometer tubes are so arranged that the mercury levels in them will form a visual graph of the various forces about the circumference of a piston ring being tested.

The force measuring unit is shown in detail in Figure 3, wherein there is illustrated a valve mechanism 22 for controlling the entry of compressed air which passes through a fixed orifice 23. The open end of chamber 24 is closed by a disk valve 25 whose stem is guided in an axial hole drilled in the body of the force measuring unit. A steel ball 26 transmits the force of the air pressure against plunger 27 which, in turn, transmits the force to a piston ring 28 shown in position within the cylinder and supported on a supporting ring 29. Pressure necessary to force the piston ring just clear of the wall of cylinder 11 opens the valve 25 and the escaping air passes to the atmosphere. A pressure which indicates the resistance offered the escaping air by the disk valve is built up in chamber 24 and is transmitted by conduit 19 to the corresponding manometer tube. The entire force measuring unit is adjustable with relation to the cylinder 11 by means of an adjustable screw mechanism 30.

The end of the plunger illustrated which is cylindrical is ground flat and perpendicular to the axis of the plunger. This permits examination of aircraft engine rings which have the outer face thereof formed into a single or double cone of small angle. Alternatively a roller or other antifriction device may be used on the end of each plunger to prevent any error which tangential friction might introduce. While not shown each plunger may be fitted with a pin to prevent its rotation.

Also alternative to the cylindrical plunger 27 there is illustrated in Figure 7 a plunger comprising a thin flat flexible piece or reed 45 which is mounted rigidly to disk valve 25 and in a vertical plane such that in pressing against the piston ring it may bend slightly such that friction will not be a factor. It will be understood that in order to allow such bending it must be narrow enough to clear the walls of the hole through which it protrudes.

The first step in preparing the instrument for use is to adjust the position of the measuring units so that ends of the plungers 27 are all equidistant from the center of the gauge ring when all slack is taken up. There are two methods of doing this. A solid disk accurately ground to the cylinder diameter can be placed in the cylinder and all units adjusted to give the same reading on the manometers. Secondly, a piston ring having a mark scribed opposite the gap can be placed in the cylinder with the mark lined up with one of the measuring units. That unit is then adjusted to give an arbitrarily chosen pressure on the manometer. The ring is then rotated 20 degrees and the adjacent unit adjusted to give the same pressure. This process is repeated until all units have been adjusted. This first adjustment is made with air flowing through all units. It is desirable to repeat the entire procedure one or, preferably, two times as a change in the position of one unit will influence the ring force on the adjacent units.

The choice of proper initial adjustment will depend upon the area of the valve face exposed to the pressure, the area of the primary orifice and the magnitude of the source pressure. It is necessary that the ring be entirely supported during a measurement by the sixteen plungers. If it touches the cylinder wall at one or more points, only part of the radial force will be exerted against the plungers and false readings will result.

With reference to Figure 4 there is shown a piston elevating device or elevator for use in the apparatus of Figure 1. It comprises an assembly of piston and rings 31 which may be taken directly from an engine which has been running. The device for raising the piston to the desired height comprises a hand wheel 32 adapted to rotate in journal 33 in the central bore of supporting stand 35. A threaded piston rod 36 is substituted for the piston rod originally attached to the piston assembly and the threads thereon cooperate with threads in journal 33 so that rotation of the hand wheel 32 will raise or lower the piston. The periphery of wheel 32 is preferably knurled and provided with numerical indices which alone or in association with scale 37 integrally associated with stand 35 indicates the exact position of the piston and ring assembly 31.

In the embodiment according to Figures 5 and 6 which show two positions of the same device, a closely fitting adapter casing 37 having holes opposite the holes in the test cylinder adapted to receive an elongated plunger is lowered into the test cylinder and supported thereon by means of a ledge 38. A resiliently supported positioning device 39 is movable to a plurality of positions in accordance with the piston and ring assembly 40 supported thereon. In Figure 5 the positioner 39 rests upon a plurality of positioner pins 41.

Further positioning means may be provided, such as the solenoid operated pins 42 and 43. When use is made of the adapter the length of the pin 27 is commensurately longer and passes through slits (not shown) in the walls of the adapter.

The device of the present invention does not measure piston ring wall pressure but such pressure is proportional to the measurements obtained. Each unit measures the force which the piston ring applies when the ring is constrained to take substantially the same shape it has in an engine cylinder. Normally it would be considered that the average pressure exerted by the ring on the cylinder wall would be the sum of all the force indications divided by the total area of the ring contacting the cylinder. However, in the case of tapered rings this area approaches a line and the exact calculation becomes indeterminate.

Thus we have described a new and useful apparatus for determining the force exerted by a piston ring on the cylinder wall.

What we claim is:

1. An apparatus for measuring the force exerted by a piston ring upon the walls of a cylinder comprising a test cylinder having a plurality of holes circumferentially arranged in the cylinder, plungers protruding through the holes and adapted to compress the piston ring just clear of the cylinder wall adjacent said plungers, a plurality of force measuring units adapted to operate said plungers, a source of fluid under pressure to supply said force measuring units, and a bank of manometer tubes each connected to one of said forces measuring units adapted to indicate pressures proportional to the force necessary to compress said piston ring.

2. An apparatus for measuring the force exerted by a piston ring upon the walls of a cylinder comprising a test cylinder having a plurality of holes circumferentially arranged in the cylinder, plungers protruding through the holes and adapted to compress a piston ring placed in the cylinder adjacent said plungers, and a plurality of force measuring units adapted to operate said plungers each such unit comprising a body attached to said test cylinder having therein a fixed orifice and a variable orifice, a disk valve adapted to control said variable orifice and operate the respective plunger associated therewith, a source of fluid under pressure adapted to pass through said fixed orifice and operate said disk valve and consequently its respective plunger and means for indicating the resistance of said disk valve to the passage of said fluid.

3. An apparatus for measuring the force exerted by a piston upon the walls of a cylinder comprising a test cylinder having a plurality of holes circumferentially arranged in the cylinder, plungers protruding through the holes and adapted to compress the piston ring in the cylinder adjacent said plungers, a plurality of force measuring units adapted to operate said plungers, each such unit comprising a body attached to said cylinder having therein a fixed orifice and a variable orifice, a disk valve adapted to control said variable orifice and operate the respective plunger associated therewith, a source of air under pressure adapted to pass through said fixed orifice and operate said disk valve and consequently its respective plunger, and a bank of manometer tubes each connected to one of said force measuring units adapted to indicate pressures proportional to the force necessary to compress said piston ring.

4. In an apparatus for measuring the force exerted by a piston ring upon the walls of a test cylinder, a force measuring unit comprising a body attached to said test cylinder having therein a fixed orifice and a variable orifice, a disk valve adapted to control said variable orifice, a plunger extending through a hole in the wall of said cylinder adapted to operate toward a piston ring positioned in said cylinder, said disk valve adapted to operate said plunger, a source of air under pressure adapted to pass through said fixed orifice and operate said disk valve and consequently said plunger, and means for indicating the resistance of said disk valve to the escape of said air.

5. In an apparatus for measuring the force exerted by a piston ring upon the walls of a test cylinder, a force measuring unit comprising a body attached to said test cylinder having therein a small fixed orifice and a variable orifice, a disk valve adapted to seat in said variable orifice, a plunger extending through a hole in the walls of said cylinder adapted to compress a piston ring positioned in said cylinder, said disk valve adapted to operate said plunger when unseated, a source of air under pressure adapted to pass through said fixed orifice and unseat said disk valve and consequently operate said plunger, and a manometer tube adapted to indicate the air pressure within said measuring unit caused by the resistance to the escaping air offered by said disk valve.

6. In an apparatus for measuring the force exerted by a piston ring upon the walls of a test cylinder, a force measuring unit comprising a body attached to said test cylinder having therein a fixed orifice and a variable orifice, a disk valve adapted to control said variable orifice, a thin, flat reed mounted rigidly to said disk valve with its flat faces in vertical plane to permit slight lateral flexing sufficient to avoid tangential friction, said reed extending through a hole in the wall of said cylinder toward a piston ring positioned in said cylinder and being of sufficient rigidity in longitudinal direction to cause compression of the piston ring, a source of air under pressure adapted to pass through said fixed orifice and operate said disk valve and reed, and means for indicating the resistance of said disk valve to the escape of said air.

7. An apparatus for measuring the force exerted by a piston ring upon the walls of a cylinder comprising a test cylinder having a plurality of holes circumferentially arranged in the cylinder, plungers protruding through the holes and adapted to compress said piston ring placed in the cylinder adjacent said plungers, and a plurality of force measuring units adapted to operate said plungers and indicate the force necessary to do so, and a piston elevating device adapted to present various piston rings at said plurality of circumferentially arranged holes, comprising a piston having attached thereto a plurality of piston rings and a screw threaded elevating device adapted to raise or lower said piston in said test cylinder a measurable distance.

8. An apparatus for measuring a force exerted by a piston ring upon the walls of a cylinder comprising a test cylinder having a plurality of holes circumferentially arranged in the cylinder, plungers protruding through the holes and adapted to compress said piston ring plates in the cylinder adjacent said plungers, a plurality of force measuring units adapted to operate said plungers and indicate the force necessary to do so, an adapter case closely fitting within said test cylinder and having holes opposite the holes in said test cylinder, a piston operating therein containing a plurality of piston rings, a spring device for raising said piston and means for securing said piston at levels such that successive piston rings are brought opposite the holes in said adapted casing so that said plungers can compress said piston rings.

9. An apparatus for measuring the force exerted by a piston ring upon the walls of a cylinder comprising a conforming test cylinder having a plurality of holes circumferentially arranged therein, plungers protruding through the holes and adapted to compress a piston ring placed in the conforming cylinder adjacent said plungers, and a plurality of force measuring units adapted to operate said plungers, each said unit comprising a fluid pressure operated device to which fluid is supplied from a source of constant pressure urging said plungers in a direction to deform the ring under test, pressure relief means variably controlled by movement of said plungers, whereby as the plungers deform the ring the pressure from source is relieved to a value counterbalancing the outward force of the ring, and means for measuring the fluid pressure required to counterbalance outward force of the ring.

10. An apparatus for measuring the force exerted by a piston ring upon the walls of a cylinder comprising a conforming test cylinder having a plurality of holes circumferentially arranged in the cylinder, plungers protruding through the holes and adapted to compress a piston ring placed in the cylinder adjacent said plungers, and a plurality of force measuring units adapted to operate said plungers each comprising a body attached to said test cylinder having therein a fixed orifice and a variable orifice, a valve adapted to control said variable orifice and operate said plungers, a source of fluid under pressure adapted to pass through said fixed orifice and operate said valve and consequently the respective plunger associated therewith and means for indicating the resistance of said valve to the passage of said fluid.

11. An apparatus for measuring the force exerted by a piston ring upon the walls of a cylinder comprising a conforming test cylinder having a plurality of holes circumferentially arranged in the cylinder, plungers protruding through the holes and adapted to compress a piston ring placed in the cylinder adjacent said plungers, and a plurality of force measuring units adapted to operate said plungers, each unit comprising means for transmitting fluid pressure to said plunger and for limiting the fluid pressure to that necessary to force the piston ring just clear of the wall of the test cylinder, said means comprising a body having a small fixed orifice and a variable orifice, the variable orifice being controlled by movement of the means for transmitting fluid pressure to the plunger, said variable orifice giving a large change in flow area with a small displacement of said fluid pressure transmitting means, and means for measuring the fluid pressure transmitted by the plunger to the piston ring.

12. Apparatus for measuring the force exerted by a piston ring upon the wall of a cylinder from which measurements the displacements of the ring with respect to such wall may be derived, comprising a conforming test cylinder having a plurality of holes circumferentially arranged therein, plungers extending through the holes and adapted to compress a piston ring placed in the conforming cylinder adjacent said plungers, fluid operated measuring units associated with the respective plungers, each said measuring unit comprising a body defining a chamber having a fixed inlet orifice therein communicating with a source of fluid under constant pressure, and a discharge orifice therein, means movable with respect to the discharge orifice for varying the same, said means operating through said respective plungers to compress the piston ring under test and at the same time to vary the discharge orifice and consequent escape of pressure fluid as necessary to balance piston ring force by back pressure of such fluid, and means for indicating the back pressure in each measuring unit as a measurement of force exerted by the piston ring.

REGINALD J. S. PIGOTT.
PAUL G. EXLINE.

REFERENCES CITED

The following references are of record in the file of this patent:

UNITED STATES PATENTS

| Number | Name | Date |
| --- | --- | --- |
| 1,174,251 | Hankins et al. | Mar. 7, 1916 |
| 1,332,571 | Ray | Mar. 2, 1920 |
| 1,457,933 | Peterson | June 5, 1923 |
| 1,760,518 | Okoehi et al. | May 27, 1930 |
| 1,883,522 | Breer | Oct. 18, 1932 |
| 2,121,980 | Prochaska | June 28, 1938 |